(12) United States Patent
Sekiguchi et al.

(10) Patent No.: US 6,603,787 B1
(45) Date of Patent: Aug. 5, 2003

(54) DISCHARGE-PUMPED EXCIMER LASER DEVICE

(75) Inventors: Shinichi Sekiguchi, Yokohama (JP); Hiroyuki Shinozaki, Fujisawa (JP); Toshimitsu Barada, Tokyo (JP); Toshiharu Nakazawa, Chigasaki (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/576,208

(22) Filed: May 23, 2000

(30) Foreign Application Priority Data

May 25, 1999 (JP) .......................... 11-145168
Jul. 15, 1999 (JP) .......................... 11-201851

(51) Int. Cl.[7] ............................................ H01S 3/225
(52) U.S. Cl. ................................. 372/57; 372/58
(58) Field of Search .................... 372/57–58, 59

(56) References Cited

U.S. PATENT DOCUMENTS

| | | | |
|---|---|---|---|
| 4,534,034 A | * 8/1985 | Hohla et al. | 372/59 |
| 4,975,925 A | * 12/1990 | Derrickson | 372/58 |
| 5,175,063 A | * 12/1992 | Ishihara et al. | 429/32 |
| 5,291,509 A | 3/1994 | Mizoguchi et al. | 372/65 |
| 5,870,420 A | 2/1999 | Webb | 372/97 |
| 5,970,082 A | * 10/1999 | Ershov | 372/102 |
| 6,061,376 A | * 5/2000 | Hofmann et al. | 372/58 |
| 6,111,907 A | * 8/2000 | Ozarski | 372/107 |

FOREIGN PATENT DOCUMENTS

| | | |
|---|---|---|
| DE | 42 27 013 A1 | 2/1994 |
| EP | 0 470 637 A1 | 2/1992 |
| JP | 62-194025 | 8/1987 |
| JP | 10-173259 | 6/1998 |
| WO | WO 00/33431 | 8/2000 |

OTHER PUBLICATIONS

European Search Report dated Sep. 18, 2001.

* cited by examiner

*Primary Examiner*—Paul Ip
*Assistant Examiner*—James Menefee
(74) *Attorney, Agent, or Firm*—Armstrong, Westerman & Hattori, LLP

(57) ABSTRACT

A discharge-pumped excimer laser device has a casing, a pair main discharge electrodes, a cross-flow fan for producing a high-speed laser gas flow between the main discharge electrodes, the cross-flow fan having a rotatable shaft projecting from opposite ends thereof, magnetic bearings, the rotatable shaft being rotatably supported by the bearings, protective bearings for supporting the rotatable shaft when the magnetic bearings are not in operation, and a motor for actuating the cross-flow fan. The magnetic bearings include radial magnetic bearings disposed on the opposite ends of the rotatable shaft. One of the radial magnetic bearings which is disposed closely to the motor has a bearing rigidity greater than the bearing rigidity of the magnetic bearing that is disposed remotely from the motor.

8 Claims, 13 Drawing Sheets

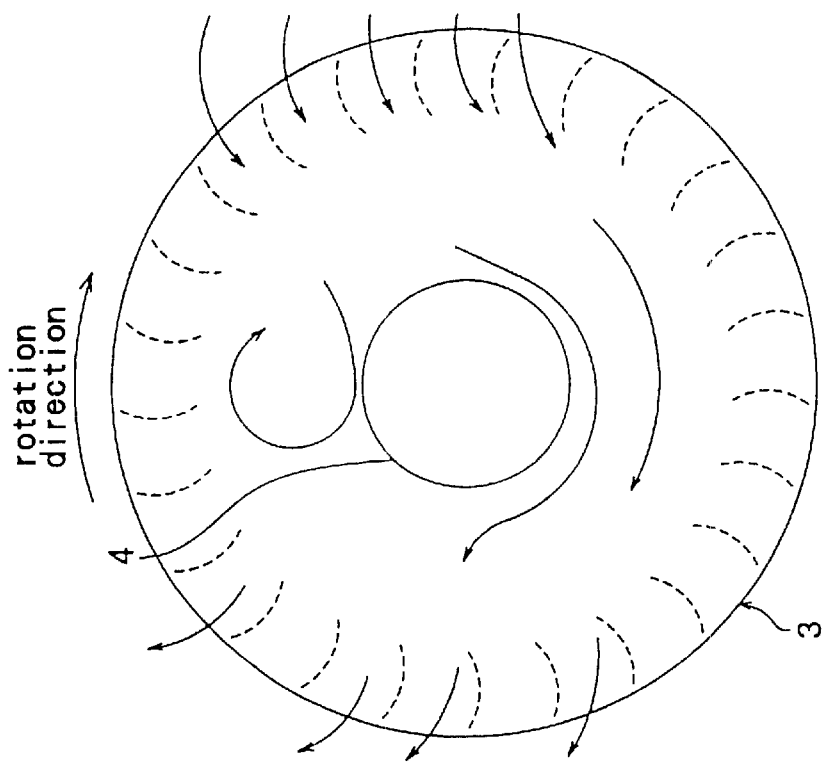
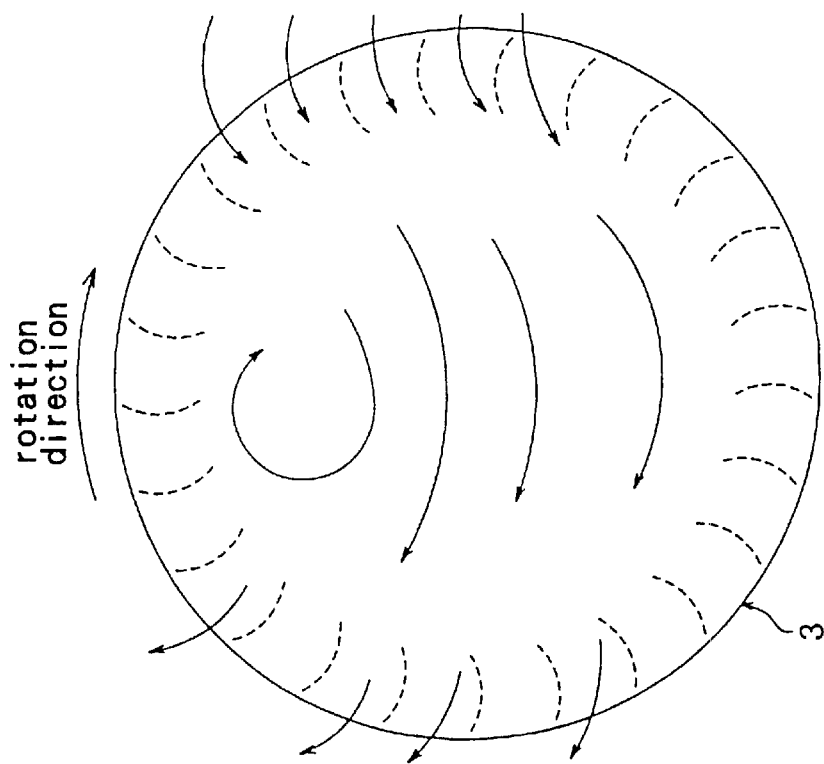

DISCHARGE-PUMPED EXCIMER LASER DEVICE

BACKGROUND OF THE INVENTION

1. Field of the Invention

The present invention relates to a discharge-pumped excimer laser device having a cross-flow fan whose rotatable shaft is rotatably supported by magnetic bearings, and more particularly to a discharge-pumped excimer laser device with an improved layout for magnetic bearings and improved protective bearings.

2. Description of the Related Art

FIG. 1 of the accompanying drawings schematically shows a conventional excimer laser device. As shown in FIG. 1, the conventional excimer laser device has a casing 101 filled with a laser gas, a preliminary ionizing electrode (not shown) disposed in the casing 101 for preliminarily ionizing the laser gas, and a pair of main discharge electrodes 102 disposed in the casing 101 for producing an electric discharge to make it possible to oscillate a laser beam. The casing 101 also houses therein a cross-flow fan 103 for producing a high-speed gas flow between the main discharge electrodes 102.

The cross-flow fan 103 has a rotatable shaft 104 projecting from opposite ends thereof and rotatably supported in a non-contact manner by a plurality of radial magnetic bearings 106, 107 disposed on opposite sides of the casing 101 and an axial magnetic bearing 108 disposed near the radial magnetic bearing 106. The rotatable shaft 104 can be rotated by an induction motor 109 connected to an end thereof near the radial magnetic bearing 107. The casing 101 has a pair of windows 105 on its opposite ends for emitting the laser beam out of the casing 101.

When the radial magnetic bearings 106, 107 are not in operation, the rotatable shaft 104 is supported by protective bearings 110, 111 that are disposed respectively on the shaft end near the motor 109 and on the shaft end near the radial magnetic bearing 106. The protective bearings 110, 111 cannot use a general lubricant for the purpose of preventing the laser gas from being contaminated. The protective bearings 110, 111 are in the form of rolling bearings each comprising special self-lubricated balls that are highly resistant to corrosion and inner and outer races of stainless steel.

When a high voltage is applied between the main discharge electrodes 102, an electric discharge occurs therebetween to generate a laser beam. The generated laser beam is emitted through the windows 105 out of the casing 101. When the electric discharge occurs, the laser gas between the main discharge electrodes 102 is deteriorated and its discharge characteristics are impaired to the extent that no repetitive discharge pumping will be possible. To avoid this shortcoming, the cross-flow fan 103 is operated to circulate the laser gas in the casing 101 to generate a high-speed laser gas flow between the main discharge electrodes 102. Specifically, the laser gas between the main discharge electrodes 102 is replaced each time an electric discharge occurs therebetween for thereby performing stable repetitive pumping.

In the above conventional excimer laser device, however, the cross-flow fan 103 vibrates relatively largely during operation, tending to cause optical components (not shown) of the excimer laser device to have their optical axes displaced, imposing adverse effects on the properties of the laser beam. Specifically, when the excimer laser device is in operation, the laser gas in the casing 101 is pressurized to a pressure ranging from 1 to 3 $kg/cm^2$ while the cross-flow fan 103 is rotating. Therefore, the cross-flow fan 103 needs a large drive power, and hence the motor 109 is required to be large in size. The motor 109 applies a rotational drive power to the cross-flow fan, and produces a radial magnetic attractive force which produces vibrations because of an eccentric positional error between its rotor and stator due to assembling errors and machining errors. Inasmuch as the radial magnetic attractive force is greater in proportion to the surface area of the rotor of the motor 109, the vibrations caused by the radial magnetic attractive force also become greater if the motor 109 is greater in size.

In recent years, there is a demand for discharge-pumped excimer laser devices to produce a high laser beam output by way of highly repetitive pumping. To achieve the highly repetitive pumping, the laser gas between the main discharge electrodes 102 needs to be replaced in a shorter period of time, and hence the laser gas flow generated by the cross-flow fan 103 needs to be higher in speed. The motor 109 needs to be large in size in order to rotate the cross-flow fan 103 at a higher speed. If the motor 109 becomes larger in size, the radial magnetic attractive force produced by the motor 109 is also larger in magnitude. Thus, the motor 109 produces larger vibrations, which make it difficult for the motor 109 to rotate at a higher speed. As a result, the discharge-pumped excimer laser device is unable to carry out stable highly repetitive pumping.

The protective bearings 110, 111 are positioned on the shaft ends where dust particles produced in the casing 101 during operation find it difficult to reach because such dust particles would otherwise enter rolling surfaces of the protective bearings 110, 111 to obstruct rotation thereof. With the protective bearings 110, 111 positioned on the shaft ends, however, when the rotatable shaft 104 of the cross-flow fan 103 is supported by the protective bearings 110, 111 while the radial magnetic bearings 106, 107 are not in operation, e.g., while the discharge-pumped excimer laser device is not in operation or is being shipped, the inter-bearing span or distance between the protective bearings 110, 111 is longer than when the rotatable shaft 104 is supported by the radial magnetic bearings 106, 107.

As a result, the static deflection of the rotatable shaft 104 supported by the protective bearings 110, 111 increases. Consequently, an air gap around the rotatable shaft 104 needs to be increased so as to prevent the outer circumferential surfaces of the rotatable shaft 104 at the radial magnetic bearings 106, 107 and the motor 109 from physically contacting inner casing surfaces. One problem with the increased air gap is that it reduces the operating forces of the radial magnetic bearings 106, 107. Specifically, as the air gap becomes greater, larger magnetic bearings are required. Since the operating forces of magnetic bearings are generally lowered in proportion to the square of the air gap, if the air gap is increased twice, then magnetic bearings that are four times greater in size will be required.

If the rotatable shaft 104 needs to be supported by the protective bearings 110, 111 due to a failure of the radial magnetic bearings 106, 107, then the critical speed of the rotatable shaft 104 is reduced as the inter-bearing span becomes longer than when the rotatable shaft 104 is supported by the radial magnetic bearings 106, 107. When the rotatable shaft 104 is supported by the protective bearings 110, 111, therefore, it suffers violent vibrations upon rotation, displacing the optical axes of the optical components of the discharge-pumped excimer laser device. For restarting the discharge-pumped excimer laser device, therefore, the optical axes are required to be adjusted again. Accordingly, the discharge-pumped excimer laser device cannot quickly be restarted.

The self-lubricated balls of the protective bearings 110, 111 have a relatively low allowable rotational speed and allowable load because they have a problem as to their mechanical strength. If the cross-flow fan 103 rotates at higher speeds and the motor 109 becomes larger in size and hence the rotatable shaft 104 becomes larger in size, then the protective bearings 110, 111 cannot be used due to the insufficient mechanical strength thereof.

FIG. 2 of the accompanying drawings shows the conventional cross-flow fan 103. As shown in FIG. 2, the conventional cross-flow fan 103 comprises a plurality of parallel blades 103a, a pair of ring plates 103b attached to opposite ends of the blades 103a, and a pair of ring plates 103c disposed between the ring plates 103b at spaced intervals in the axial direction of the rotatable shaft 104. The ring plates 103c have attachment holes or recesses defined therein near their outer circumferential edges for attachment of the blades 103a. The ring plates 103b on the opposite ends of the blades 103a also have attachment holes or recesses defined therein near their outer circumferential edges for attachment of the blades 103a, and attachment bosses at their inner circumferential edges for attachment of the rotatable shaft 104. For assembling the cross-flow fan 103, the blades 103a are inserted through the attachment holes or recesses axially along the rotatable shaft 104, and the outer circumferential edges of all the ring plates 103b, 103c are crimped to set the blades 103a in place.

The rotatable shaft 104 is installed in order to support the cross-flow fan 103 rotatably and impart the rotational drive power to the cross-flow fan 103. The rotatable shaft 104 extends axially through the cross-flow fan 103 and projects from the ring plates 103b at the opposite ends. Displacement sensor target and electromagnet targets of the magnetic bearings, and the motor rotor are fixed to the projecting ends of the rotatable shaft 104. The rotatable shaft 104 extends axially through the cross-flow fan 103 because the cage-shaped structure composed of the blades 103a and the ring plates 103b, 103c is low in mechanical strength, and the displacement sensor targets, the electromagnet targets, and the motor rotor as mounted on the opposite ends of the cross-flow fan 103 would deform the cross-flow fan 103.

The cross-flow fan 103 and the rotatable shaft 104 are assembled together by inserting the rotatable shaft 104 axially through the cross-flow fan 103 and the attachment bosses of the ring plates 103b are fixed to the rotatable shaft 104 by setscrews 103d.

The cross-flow fan 103 shown in FIG. 2 is problematic in that the setscrews 103d are liable to work loose due to vibrations applied while the discharge-pumped excimer laser device is in operation or is being shipped. If the cross-flow fan 103 is made of aluminum, then when the rotatable shaft 104 undergoes a temperature cycle to increase its temperature during discharge pumping, the setscrews 103d may possibly work loose. When the setscrews 103 are loosened, the cross-flow fan 103 is displaced axially, failing to produce a desired gas flow between the main discharge electrodes 102. If no desired gas flow is produced, then the discharge-pumped excimer laser device is incapable of stable discharge pumping. The rotatable shaft 104 is also possibly displaced radially in gaps between itself and the attachment bosses, tending to change unbalancing forces on the rotatable shaft 104. When unbalancing forces on the rotatable shaft 104 are changed, large vibrations are produced to displace the optical axes of the optical components of the discharge-pumped excimer laser device, thus adversely affecting the laser beam output.

SUMMARY OF THE INVENTION

It is therefore an object of the present invention to provide a discharge-pumped excimer laser device which will solve the problems of the conventional discharge-pumped excimer laser device and has a cross-flow fan that causes relatively small vibrations and can rotate at a high speed.

To achieve the above object, there is provided in accordance with the present invention a discharge-pumped excimer laser device comprising a casing filled with a laser gas, a pair of main discharge electrodes disposed in the casing for producing an electric discharge to discharge-pump the laser gas to emit a laser beam, a cross-flow fan for producing a high-speed laser gas flow between the main discharge electrodes, the cross-flow fan having a rotatable shaft projecting from opposite ends thereof, magnetic bearings, the rotatable shaft being rotatably supported in a non-contact manner by the bearings, protective bearings for supporting the rotatable shaft when the magnetic bearings are not in operation, and a motor for actuating the cross-flow fan, the magnetic bearings including radial magnetic bearings disposed respectively on the opposite ends of the cross-flow fan, the motor being disposed on an end of the rotatable shaft near one of the radial magnetic bearings, the one of the radial magnetic bearings having a bearing rigidity greater than the bearing rigidity of the radial magnetic bearing which is disposed remotely from the motor.

With the above arrangement, since the bearing rigidity of the radial magnetic bearing near the motor is greater than the bearing rigidity of the radial magnetic bearing which is disposed remotely from the motor, vibrations caused by radial magnetic attractive forces of the motor are effectively suppressed by the radial magnetic bearing disposed near the motor, and vibrations caused by an unbalanced state due to a misalignment between the center of rotation of the rotatable shaft and the center of gravity of the rotatable shaft are also suppressed by the radial magnetic bearing whose bearing rigidity is greater than the bearing rigidity of the other radial magnetic bearing. Therefore, the cross-flow fan causes reduced vibrations and can be rotated at a high speed, and hence the discharge-pumped excimer laser device is capable of repetitive discharge pumping and can emit a laser beam of stable characteristics.

The radial magnetic bearings have respective electromagnets having respective cores, the core of the electromagnet of the one of the radial magnetic bearings having a cross-sectional area greater than the cross-sectional area of the core of the electromagnet of the radial magnetic bearing which is disposed remotely from the motor, whereby the bearing rigidity of the one of the radial magnetic bearings is greater than the bearing rigidity of the radial magnetic bearing which is disposed remotely from the motor.

The radial magnetic bearings have respective electromagnets and respective electromagnet targets, and the dimension of a gap between the electromagnet and the electromagnet target of the one of the radial magnetic bearings is smaller than the dimension of a gap between the electromagnet and the electromagnet target of the radial magnetic bearing which is disposed remotely from the motor, whereby the bearing rigidity of the one of the radial magnetic bearings is greater than the bearing rigidity of the radial magnetic bearing which is disposed remotely from the motor.

The radial magnetic bearings have respective electromagnets including respective coils, and the number of turns of the coil of the electromagnet of the one of the radial magnetic bearings is greater than the number of turns of the coil of the electromagnet of the radial magnetic bearing which is disposed remotely from the motor, whereby the bearing rigidity of the one of the radial magnetic bearings is greater than the bearing rigidity of the radial magnetic bearing which is disposed remotely from the motor.

The magnetic bearings include another radial magnetic bearing disposed on a shaft end of the motor.

The rotatable shaft is rotatably supported by the radial magnetic bearings disposed on the opposite ends of the cross-flow fan and the radial magnetic bearing disposed on the shaft end of the motor. The motor is disposed outwardly of the span between the radial magnetic bearings disposed on respectively on the opposite ends of the cross-flow fan, and applies a rotational drive power to the cross-flow fan. With the motor being thus positioned, vibrations caused by radial magnetic attractive forces of the motor are suppressed by the radial magnetic bearing disposed on the shaft end of the motor. The cross-flow fan causes reduced vibrations and can be rotated at a high speed, so that the discharge-pumped excimer laser device is capable of repetitive discharge pumping and can emit a laser beam of stable characteristics.

According to the present invention, there is also provided a discharge-pumped excimer laser device comprising a casing filled with a laser gas, a pair of main discharge electrodes disposed in the casing for producing an electric discharge to discharge-pump the laser gas to emit a laser beam, a cross-flow fan for producing a high-speed laser gas flow between the main discharge electrodes, the cross-flow fan having a rotatable shaft projecting from opposite ends thereof, magnetic bearings, the rotatable shaft being rotatably supported in a non-contact manner by the bearings, the magnetic bearings including radial magnetic bearings disposed respectively on the opposite ends of the cross-flow fan, protective bearings for supporting the rotatable shaft when the magnetic bearings are not in operation, a motor for actuating the cross-flow fan, and a laser gas inlet passage for introducing the laser gas, from which dust particles are removed, into ends, remote from the cross-flow fan, of the radial magnetic bearings disposed respectively on the opposite ends of the cross-flow fan and the motor, or a differential pressure generating mechanism disposed between gas flow paths interconnecting the casing and the magnetic bearings, the protective bearings including protective bearings disposed respectively near the radial magnetic bearings on the opposite ends of the cross-flow fan.

With the above arrangement, because the laser gas inlet passage is provided for introducing the laser gas, from which dust particles are removed, into ends, remote from the cross-flow fan, of the radial magnetic bearings disposed respectively on the opposite ends of the cross-flow fan and the motor, or the differential pressure generating mechanism is disposed between gas flow paths interconnecting the casing and the magnetic bearings, dust particles produced in the casing while the discharge-pumped excimer laser device is in operation do not enter the magnetic bearings and the motor. Consequently, the protective bearings do not need to be disposed on the ends of the rotatable shaft, but can be disposed near the radial magnetic bearings. The inter-bearing span of the rotatable shaft when it is supported by the radial magnetic bearings is substantially the same as the inter-bearing span of the rotatable shaft when it is supported by the protective bearings, and as a result, the static deflection of the rotatable shaft remains substantially the same regardless of whether the rotatable shaft is supported by the radial magnetic bearings or the protective bearings. Consequently, an air gap between the outer circumferential surfaces of the rotatable shaft at the radial magnetic bearings and the motor and inner casing surfaces can be reduced. Thus, the magnetic bearings and the motor can be reduced in size.

Even if the rotatable shaft needs to be supported by the protective bearings due to a failure of the radial magnetic bearings, the critical speed of the rotatable shaft does not change greatly, and hence vibrations of the rotatable shaft are reduced upon its rotation. Therefore, other components and peripheral devices of the discharge-pumped excimer laser device are not adversely affected by the vibrations, and hence discharge-pumped excimer laser device can quickly be restarted.

The protective bearings comprise rolling bearings each comprising rolling members, an inner race, and an outer race, at least one of the rolling members, the inner race, and the outer race being made of alumina ceramics or zirconia ceramics.

The alumina ceramics or zirconia ceramics, which at least one of the rolling members, the inner race, and the outer race is made of, is corrosion-resistant to the laser gas and has a large mechanical strength. The protective bearings made of the alumina ceramics or zirconia ceramics have a long service life and may be replaced at long intervals. Even when the rotational speed of the cross-flow fan is higher or the motor is larger in size, posing a larger load on the protective bearings, the protective bearings can operate effectively.

The protective bearings comprise sliding bearings each made of alumina ceramics, zirconia ceramics, polytetrafluoroethylene, or a composite material thereof.

The sliding bearings each made of alumina ceramics, zirconia ceramics, polytetrafluoroethylene, or a composite material thereof are of a structure having less gas traps and can be manufactured relatively inexpensively.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4A is a view showing how a laser gas flows in the cross-flow fan of a discharge-pumped excimer laser device, with no rotatable shaft therein;

FIG. 4B is a view showing how a laser gas flows in the cross-flow fan of a discharge-pumped excimer laser device, with a rotatable shaft therein;

DETAILED DESCRIPTION OF THE PREFERRED EMBODIMENTS

A discharge-pumped excimer laser device according to an embodiment of the present invention will be described below with reference to FIG. 3.

Figure 3:
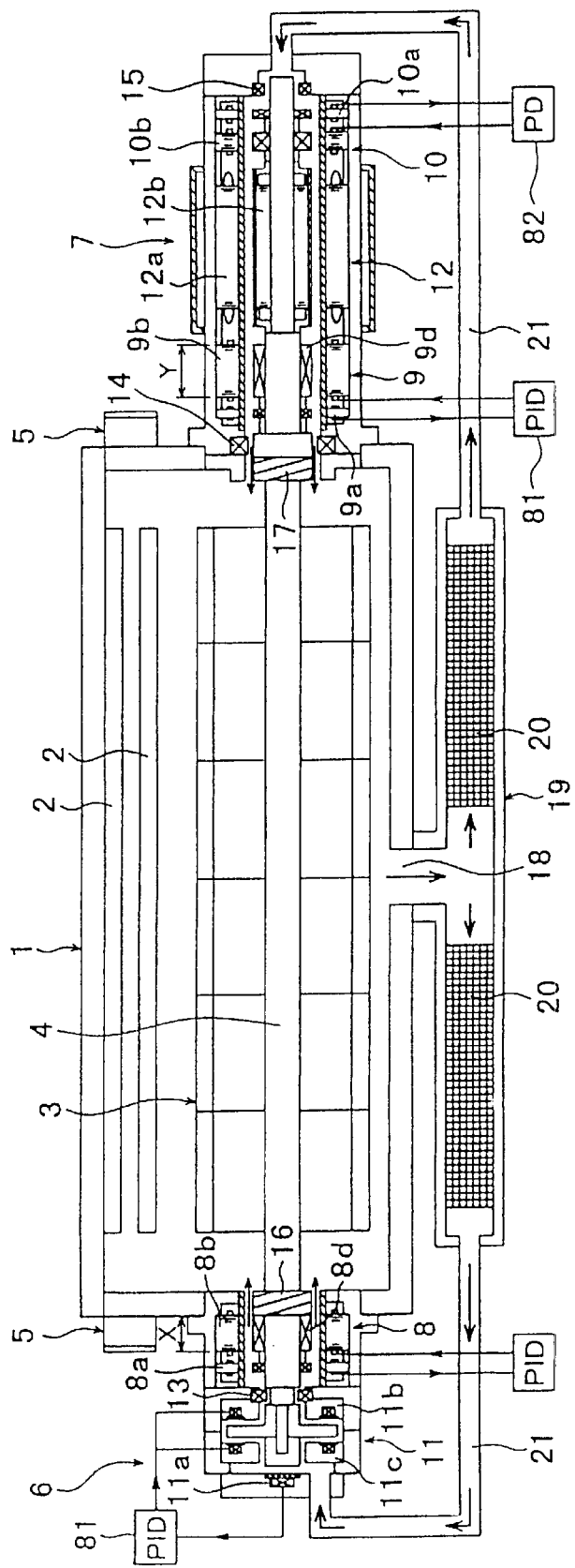
FIG. 3 is an axial cross-sectional view of a discharge-pumped excimer laser device according to an embodiment of the present invention.

As shown in FIG. 3, the discharge-pumped excimer laser device according to an embodiment of the present invention comprises a casing 1 filled with a laser gas, a preliminary ionizing electrode (not shown) disposed in the casing 1 for preliminarily ionizing the laser gas, and a pair of main discharge electrodes 2 disposed in the casing 1 for producing an electric discharge to make it possible to oscillate a laser beam. The casing 1 also houses therein a cross-flow fan 3 for producing a high-speed gas flow between the main discharge electrodes 2.

When a high voltage is applied between the main discharge electrodes 2, the laser gas between the main discharge electrodes 2 is discharge-pumped to oscillate a laser beam. The generated laser beam is emitted out of the casing 1 through windows 5 mounted on opposite ends of the casing 1. When the laser gas is discharge-pumped, the laser gas between the main discharge electrodes 2 is deteriorated and its discharge characteristics are lowered to the extent that no repetitive pumping could be performed. Therefore, the cross-flow fan 3 is operated to circulate the laser gas in the casing 1 for thereby replacing the laser gas between the main discharge electrodes 2 in each discharge cycle for stable repetitive pumping.

The main discharge electrodes 2 are spaced from each other by a distance of about 20 mm, and have an overall length of about 600 mm. The cross-flow fan 3 has an overall length slightly smaller than the main discharge electrodes 2 in order to produce a uniform gas flow over the entire length of the main discharge electrodes 2. The cross-flow fan 3 is rotated at a speed ranging from 2500 to 3500 rpm to produce a sufficient gas flow necessary between the main discharge electrodes 2.

The cross-flow fan 3 has a rotatable shaft 4 extending axially therethrough and projecting from opposite ends thereof. The rotatable shaft 4 is rotatably supported in a non-contact manner by a plurality of radial magnetic bearings 8, 9, 10 and an axial magnetic bearing 11 which are disposed in a cylindrical bearing housing 6 and a cylindrical motor housing 7 that are mounted on opposite ends of the casing 1. The rotatable shaft 4 can be rotated by a motor 12 disposed in the motor housing 7.

In order to rotate the cross-flow fan 3 stably at the speed ranging from 2500 to 3500 rpm, the critical speed of the rotatable shaft 4 is selected to be higher than the operating rotational speed thereof. For example, the critical speed of the rotatable shaft 4 is usually set to about 4000 rpm. For increasing the critical speed, it is effective to increase the rigidity of the rotatable shaft 4 or reduce the inter-bearing span of the rotatable shaft 4. Particularly, reducing the inter-bearing span of the rotatable shaft 4 is more effective. In order to reduce the inter-bearing span of the rotatable shaft 4, the radial magnetic bearings 8, 9 are preferably disposed respectively on the opposite ends of the cross-flow fan 3. Since the overall length of the cross-flow fan 3 is 600 mm or more, the inter-bearing span of the rotatable shaft 4 between the radial magnetic bearings 8, 9 is about 800 mm.

The rotatable shaft 4 should be made of a material having a large Young's modulus for increasing its rigidity and having corrosion resistance against the laser gas since it is disposed in the casing 1. In this embodiment, the rotatable shaft 4 is made of austenitic stainless steel. The rotatable shaft 4 may comprise a hollow shaft having a large diameter for high rigidity. However, because the laser gas flows across and through the cross-flow fan 3 as indicated by the arrows in FIGS. 4A and 4B, the rotatable shaft 4 in the cross-flow fan 3 presents a resistance to the laser flow, tending to lower the performance of the cross-flow fan 3. Therefore, the rotatable shaft 4 should desirably be as thin as possible insofar as the critical speed can be kept at about 4000 rpm. In the present embodiment, the rotatable shaft 4 has an outside diameter of about 30 mm.

FIG. 4A shows how the laser gas flows through a cross-flow fan with no rotatable shaft therein. FIG. 4B shows how the laser gas flows through a cross-flow fan with a rotatable shaft therein.

For the purpose of reducing the inter-bearing span of the rotatable shaft 4 between the radial magnetic bearings 8, 9, the motor 12 is disposed outwardly of the radial magnetic bearing 9. The axial position of the center of gravity of the rotatable shaft 4 is thus displaced toward the motor 12. Consequently, the radial magnetic bearing 9 disposed between the cross-flow fan 3 and the motor 12 has a greater bearing rigidity than the radial magnetic bearing 8 on the opposite end of the cross-flow fan 3. The ratio between the bearing rigidities of the radial magnetic bearings 8, 9 may be selected in view of the ratio between the distances from the center of gravity to the radial magnetic bearings 8, 9.

The radial magnetic bearing 9 has an electromagnet 9b and the radial magnetic bearing 8 has an electromagnet 8b. The electromagnet 9b has a core length Y longer than a core length X of the electromagnet 8b. With the core length Y being longer than the core length X, the magnetic force produced by the electromagnet 9b is Y/X times greater than the magnetic force produced by the electromagnet 8b. Therefore, the bearing rigidity of the radial magnetic bearing 9 is increased. Furthermore, since an electromagnet target 9d of the radial magnetic bearing 9 is also increased in size, the bearing load of the radial magnetic bearing 9 is also increased. Since the instability due to the rigidity of the radial magnetic bearing 9 itself remains substantially the same, the control characteristics of the radial magnetic bearing 9 are not impaired.

During operation of the discharge-pumped excimer laser device, the motor 12 applies a rotational drive power to the rotatable shaft 4 of the cross-flow fan 3, and produces a radial magnetic attractive force which imparts vibrations to the cross-flow fan 3 because of an eccentric positional error between a rotor 12b and a stator 12a due to assembling errors and machining errors. In order to control the vibrations, the radial magnetic bearing 10 is disposed on the shaft end of the motor 12. Theoretically, the amplitude of the vibrations caused by the radial magnetic attractive force of the motor 12 is largest at the shaft end of the motor 12. By positioning the radial magnetic bearing 10 at a location where the rotatable shaft 4 vibrates with the greatest amplitude, it is possible to effectively control the vibrations of the rotatable shaft 4 of the cross-flow fan 3.

Because of the radial magnetic bearing 10 thus positioned, the axial position of the center of gravity of the rotatable shaft 4 is more displaced toward the motor 12 than if the radial magnetic bearing 10 were not provided. However, as described above, the bearing rigidity of the radial magnetic, bearing 9 may be increased to cope with the displaced center of gravity of the rotatable shaft 4. It is however necessary that the axial position of the center of gravity of the rotatable shaft 4 be located between the radial magnetic bearings 8, 9.

Since the rotatable shaft 4 is supported by the radial magnetic bearings 8, 9, no bearing load is produced on the radial magnetic bearing 10. Therefore, the radial magnetic bearing 10 is only required to have dynamic rigidity so as to be capable of controlling only the radial magnetic attractive force generated in the motor 12. Specifically, since the radial magnetic bearings 8, 9 are subject to a steady external force due to the weight of the rotatable shaft 4, the radial magnetic bearings 8, 9 are stably operated by controlling the electromagnets 8b, 9b with a PID (Proportional plus Integral plug Derivative) control circuit 81 based on output signals from displacement sensors 8a, 9a of the radial magnetic bearings 8, 9. Inasmuch as no steady external force acts on the radial magnetic bearing 10, the radial magnetic bearing 10 is stably operated by controlling an electromagnet 10b thereof with a PD (Proportional plus Derivative) control circuit 82 based on an output signal from a displacement sensor 10a of the radial magnetic bearing 10. According to the above bearing control scheme, no unwanted bending stress is generated in the rotatable shaft 4, which is prevented from interfering with the other radial magnetic bearings 8, 9.

The axial magnetic bearing 11 is not particularly limited to any location. In this embodiment, the axial magnetic bearing 11 is disposed at the shaft end in the bearing housing 6 where the rotatable shaft 4 is subject to less vibrations and where the axial magnetic bearing 11 can easily be assembled. The axial magnetic bearing 11 is stably operated by controlling electromagnets 11b, 11c thereof with the PID control circuit 81 based on output signals from a displacement sensor la of the axial magnetic bearing 11.

When the radial magnetic bearings 8, 9, 10 are not in operation, the rotatable shaft 4 is supported by protective bearings 13, 14, 15 that are disposed closely to the radial magnetic bearings 8, 9, 10. With the protective bearings 13, 14, 15 thus positioned, the inter-bearing span of the rotatable shaft 4 supported by the protective bearings 13, 14, 15 is substantially equal to the inter-bearing span of the rotatable shaft 4 supported by the radial magnetic bearings 8, 9, 10 and the axial magnetic bearing 11. Therefore, the critical speed of the rotatable shaft 4 remains substantially unchanged regardless of whether the rotatable shaft 4 is supported by the radial magnetic bearings 8, 9, 10 and the axial magnetic bearing 11 or by the protective bearings 13, 14, 15. Consequently, even if the rotatable shaft 4 needs to be supported by the protective bearings 13, 14, 15 due to a failure of the radial magnetic bearings 8, 9, 10, for example, the rotatable shaft 4 can be rotated stably.

The bearing housing 6 and the motor housing 7 have threaded labyrinths 16, 17 near the casing 1 for preventing dust particles from entering the bearing housing 6 and the motor housing 7. Dust particles produced in the casing 1 area thus prevented from entering the bearing housing 6 and the motor housing 7 and being applied to rolling surfaces of the protective bearings 13, 14. Furthermore, the casing 1 has a gas outlet port 18 from which the laser gas flows into a laser gas introduction chamber 19. Dust particles contained in the laser gas are removed by dust removing filters 20 in the laser gas introduction chamber 19. Thereafter, the laser gas is introduced via gas inlet pipes 21 into the shaft ends of the bearing housing 6 and the motor housing 7. The laser gas is thus circulated as indicated by the arrows to prevent dust particles from entering the bearing housing 6 and the motor housing 7.

Figure 5:
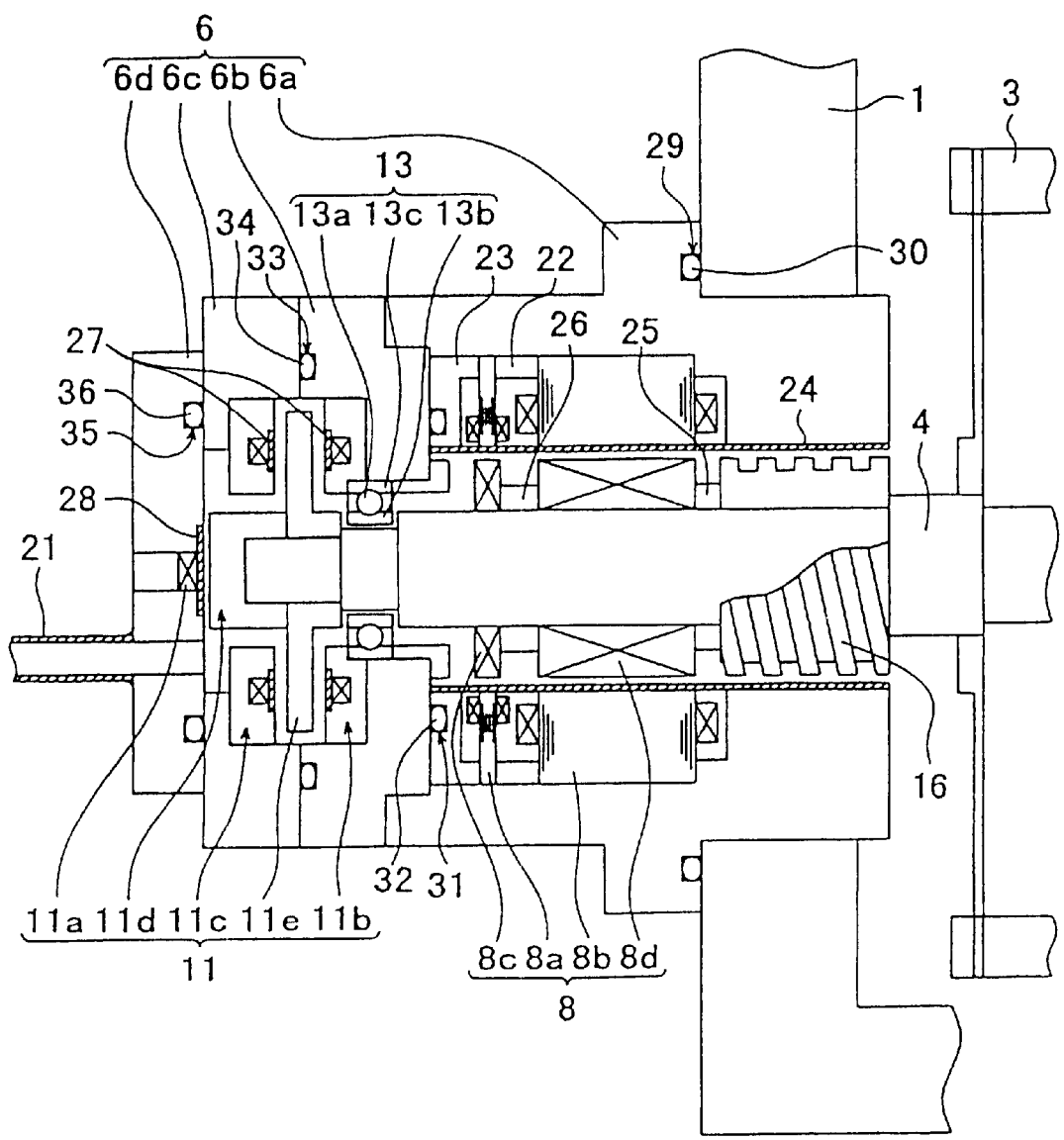
FIG. 5 is a fragmentary cross-sectional view of a bearing housing and nearby parts of the discharge-pumped excimer laser device according to the present invention.

FIG. 5 shows the bearing housing 6 and nearby parts at an enlarged scale. As shown in FIG. 5, the bearing housing 6 includes a main bearing housing body 6a which is mounted on a side wall of the casing 1. The bearing housing 6 also includes a right electromagnet housing 6b attached to the main bearing housing body 6a, a left electromagnet housing 6c attached to the right electromagnet housing 6b, and a bearing cover 6d attached to the left electromagnet housing 6c. Seal grooves 29, 31, 33, 35 are defined in respective attached surfaces, and seals 30, 32, 34, 36 are mounted in the respective seal grooves 29, 31, 33, 35 for sealing the laser gas. The seals 30, 32, 34, 36 should preferably be made of a material such as a metal, e.g., stainless steel or aluminum, which emits a reduced amount of gas containing moisture that would otherwise contaminate the laser gas.

The displacement sensor 8a and the electromagnet 8b of the radial magnetic gearing 8 are relatively positioned by a spacer 22 and a side plate 23 and accommodated in the main bearing housing body 6a. A thin cylindrical can 24 is inserted in the main bearing housing body 6a and held against the inner circumferential wall thereof, and has its opposite ends welded or otherwise secured to the main bearing housing body 6a. With this structure, the displacement sensor 8a and the electromagnet 8b, which comprise silicon steel sheets and copper wire coils that are less corrosion-resistant to the laser gas, are held out of contact with the laser gas.

The electromagnets 11b, 11c of the axial magnetic bearing 11 are welded or otherwise secured to the right and left electromagnet housings 6b, 6c in confronting relationship to each other. Electromagnet coils (not shown) are inserted into respective coil grooves defined in cores of the electromagnets 11b, 11c, and thin ring-plate cans 27 are welded or otherwise secured in place to prevent the laser gas from contacting the coils. The axial magnetic bearing 11 has an axial displacement sensor 11a housed in the bearing cover 6d, and a thin ring plate can 28 is welded or otherwise secured to a surface of the bearing cover 6d which is held in contact with the laser gas, thereby placing the axial displacement sensor 11a out of the hermetically sealed space in the bearing housing 6.

Since the electromagnets 11b, 11c are disposed in a position held in contact with the laser gas, the cores thereof are made of a permalloy (an Fe—Ni alloy containing 30–80% of Ni) which is highly corrosion-resistant to fluorine contained in the laser gas.

Figure 6:
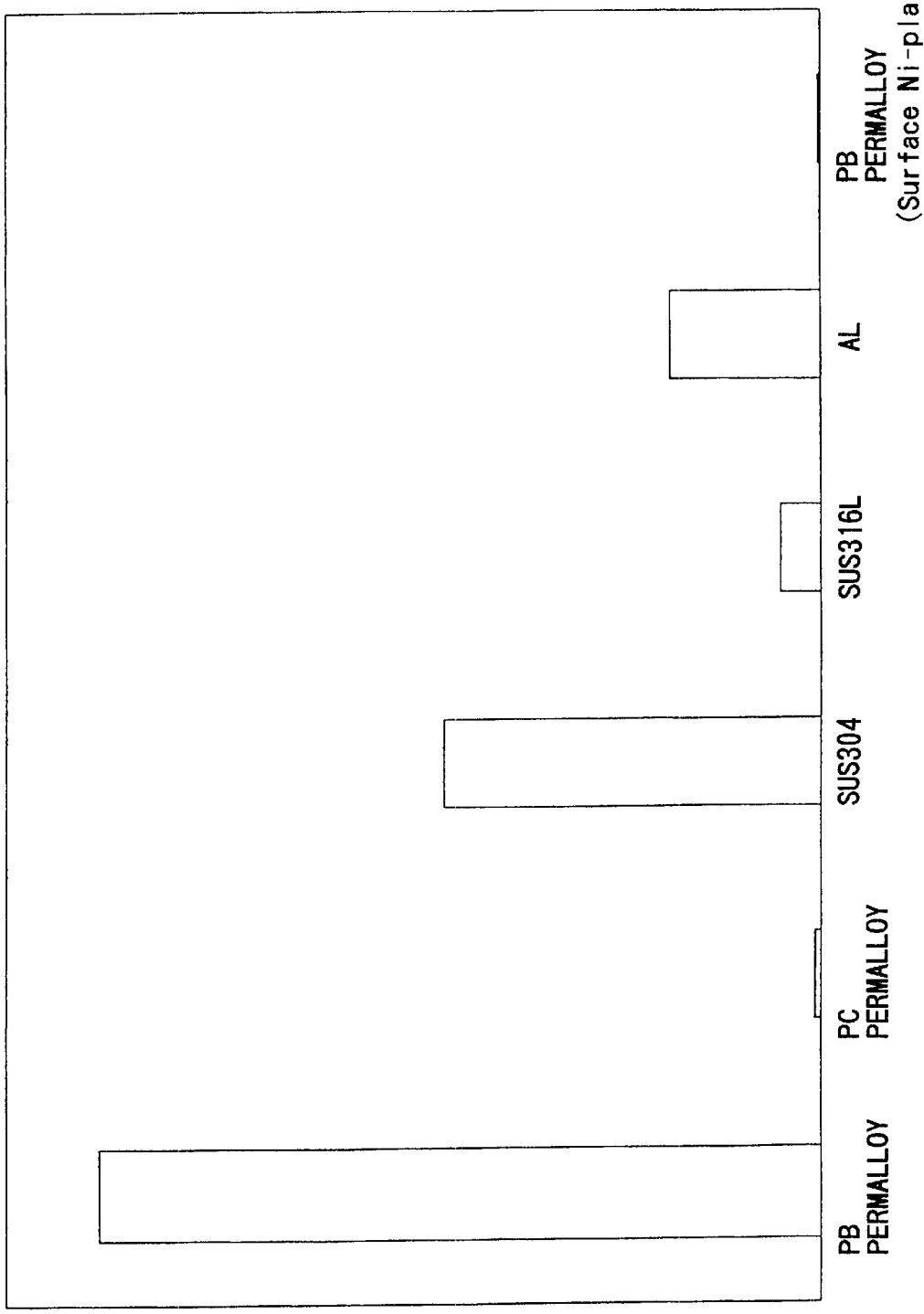
FIG. 6 is a diagram showing the results of a test conducted on permalloys for corrosion resistance against fluorine.

FIG. 6 shows the results of a test conducted on permalloys for corrosion resistance against fluorine. As shown in FIG. 6, a PC permalloy containing 80% of Ni (JISC2531) exhibits better corrosion resistance than austenitic stainless steel SUS316L. A PB permalloy containing 45% of Ni (JISC2531) has corrosion resistance against a fluorine gas which is about one-half of austenitic stainless steel SUS304 and poorer than the PC permalloy. However, since the PB permalloy has the greatest saturated magnetic flux density among permalloys and is suitable for use as an electromagnet material, the PB permalloy may be placed with a corrosion-resistant layer, e.g., a plated Ni layer, on its surface for use. The PB permalloy with a plated Ni layer exhibits similar corrosion resistance to the PC permalloy.

The cans 24, 27, 28 may be made of austenitic stainless steel or Hastelloy (nickel-chromium-molybdenum alloy) for corrosion protection against the laser gas. Since the cans 24, 27, 28 communicate with the casing 1, making up the hermetically sealed space, their wall thickness is required to withstand the pressure of the filled laser gas (1–3 kg/cm$^2$). The above materials of the cans 24, 27, 28 have a high mechanical strength, and hence the cans 24, 27, 28 may be made thin. Inasmuch as the above materials are nonmagnetic materials which do not obstruct magnetic lines of force generated by the magnetic bearings, the magnetic bearings can be operated efficiently.

The radial magnetic bearing 8 has a displacement sensor target 8c and an electromagnet target 8d that are fixedly mounted on the rotatable shaft 4 and positioned relatively to each other by rotor spacers 25, 26. The axial magnetic bearing 11 has a displacement sensor target 11d and an electromagnet target 11e that are fixedly mounted on the rotatable shaft 4 and positioned in the hermetically sealed space communicating with the casing 1.

The displacement sensor target 8c, the electromagnet target 8d, the displacement sensor target 11d, and the electromagnet target 11e are made of a permalloy (an Fe—Ni alloy containing 30–80% of Ni) which is highly corrosion-resistant to fluorine contained in the laser gas.

The displacement sensor target 8c and the electromagnet target 8d suffer an eddy current loss caused by changes in the magnetic field which occur upon rotation of the rotatable shaft 4. The displacement sensor target 8c and the electromagnet target 8d are usually constructed of stacked thin sheets in order to reduce the eddy current loss. However, if gas traps are created between the stacked thin sheets to contaminate the laser gas or if a uniform Ni layer cannot be plated with high adhesion on the surfaces of the stacked thin sheets as they are made of the PB permalloy, then the displacement sensor target 8c and the electromagnet target 8d may be made of a solid material of permalloy. The displacement sensor target 11d and the electromagnet target 11e of the axial magnetic bearing 11 are made of a solid material of permalloy because the magnetic field does not change upon rotation of the rotatable shaft 4.

The protective bearing 13 comprises a rolling bearing having rolling members 13a made of alumina ceramics and inner and outer races 13b, 13c made of stainless steel such as SUS440C or the like. Since the protective bearing 13 is disposed in the hermetically sealed space communicating with the casing 1, the rolling members 13a and the inner and outer races 13b, 13c are made of a material that is corrosion-resistant to the laser gas. Therefore, the protective bearing 13 is not deteriorated by the laser gas. Since the rolling members 13a are made of alumina ceramics, the protective bearing 13 has a large allowable rotational speed and allowable load suitable therefor. Alternatively, the rolling members 13a may be made of zirconia ceramics, and the inner and outer races 13b, 13c may be made of alumina ceramics or zirconia ceramics.

The inner and outer races 13b, 13c have rolling surfaces coated with a solid lubricant of polytetrafluoroethylene (PTFE). The solid lubricant of PTFE does not deteriorate the laser gas as it is stable with respect to the laser gas and has a high lubricating capability. Moreover, the solid lubricant is effective to make the service life of the bearing much longer than if no lubricant were used. As a result, the protective bearing 13 is not required to be replaced for a long period of time. The rolling surfaces of the inner and outer races 13b, 13c may alternatively be coated with a solid lubricant which comprises lead or an alloy containing lead.

Figure 7:
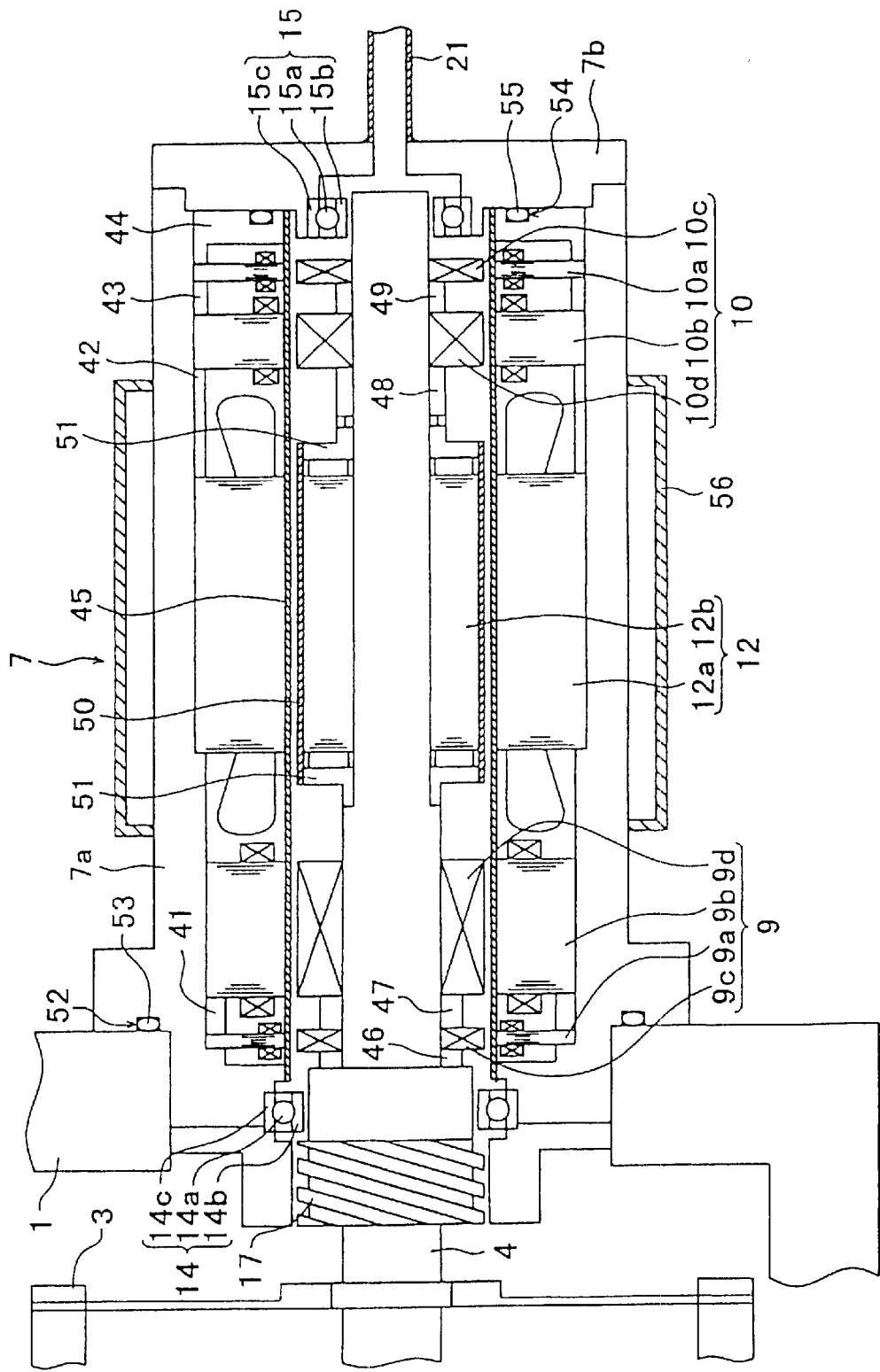
FIG. 7 is a fragmentary cross-sectional view of a motor housing and nearby parts of the discharge-pumped excimer laser device according to the present invention.

FIG. 7 shows the motor housing 7 and nearby parts at an enlarged scale. As shown in FIG. 7, the motor housing 7 includes a main motor housing body 7a which is mounted on a side wall of the casing 1. The bearing housing 6 also includes a bearing cover 7b attached to the main motor housing body 7a. Seal grooves 52, 54 are defined in respective attached surfaces, and seals 53, 55 are mounted in the respective seal grooves 52, 54 for sealing the laser gas. The seals 53, 55 should preferably be made of a material such as a metal, e.g., stainless steel or aluminum, which emits a reduced amount of gas containing moisture that would otherwise contaminate the laser gas.

The displacement sensor 9a and the electromagnet 9b of the radial magnetic bearing 9, the stator 12a of the motor 12, and the displacement sensor 10a and the electromagnet 10b of the radial magnetic bearing 10 are housed in the main motor housing body 7a and positioned relatively to each other by spacers 41, 42, 43 and a side plate 44. A thin cylindrical can 45 is inserted in the motor housing 7 and held against the inner circumferential wall thereof, and has its opposite ends welded or otherwise secured to the bearing housing 7. The can 45 is made of austenitic stainless steel or Hastelloy (nickel-chromium-molybdenum alloy) for the reasons described above. With this structure, the displacement sensor 9a, the electromagnet 9b, the displacement sensor 10a, the electromagnet 10b, and the motor stator 12a, which comprise silicon steel sheets and copper wire coils that are less corrosion-resistant to the laser gas, are held out of contact with the laser gas.

A water jacket 56 for absorbing a heat loss of several 100 w generated by the motor 12 is disposed around the main motor housing body 7a. The coil of the motor stator 12a is impregnated with an insulating material for increasing the thermal conductivity between the coil and the water jacket 56. The water jacket 56 and the impregnated insulating material are effective to prevent the motor 12 from burning and also to prevent the casing 1 from being excessively heated.

A displacement sensor target 9c of the radial magnetic bearing 9, the motor rotor 12b, and a displacement sensor target 10c and an electromagnet target 10d of the radial magnetic bearing 10 are fixedly mounted on the rotatable shaft 4 and positioned relatively to each other by rotor spacers 46, 47, 48, 49 and positioned in the hermetically sealed space communicating with the casing 1. The displacement sensor targets 9c, 10c and the electromagnet targets 9d, 10d are made of the same permalloy (an Fe—Ni alloy containing 30–80% of Ni) as the displacement sensor target 8c and the electromagnet target 8d of the radial magnetic bearing 8.

The motor rotor 12b is made of a composite material of stacked silicon steel sheets and aluminum, and hence cannot uniformly be coated with an Ni plated layer with high adhesion for corrosion resistance. A can 50 is mounted on the outer circumferential surface of the motor rotor 12b and has opposite ends welded or otherwise secured to side plates 51, which are welded or otherwise secured to the rotatable shaft 4, creating a hermetically sealed space that houses the motor rotor 12b to prevent the motor rotor 12b from contacting the laser gas. The can 50 is made of austenitic stainless steel or Hastelloy (nickel-chromium-molybdenum alloy) for corrosion protection against the laser gas.

As with the protective bearing 13 in the bearing housing 6, the protective bearings 14, 15 comprise rolling bearings having rolling members 14a, 15a made of alumina ceramics and inner and outer races 14b, 15b and 14c, 15c made of stainless steel such as SUS440C or the like.

Figure 8:
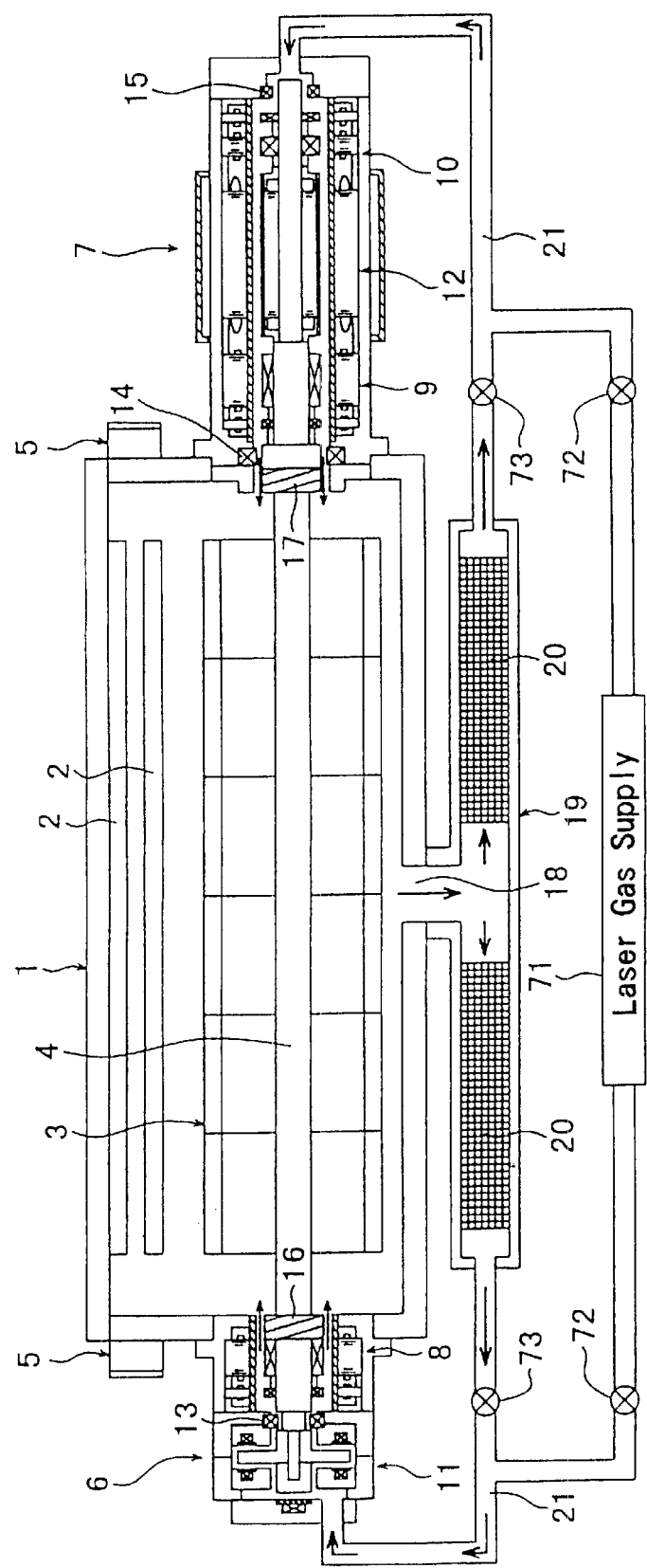
FIG. 8 is an axial cross-sectional view of a discharge-pumped excimer laser device according to another embodiment of the present invention.

FIG. 8 shows a discharge-pumped excimer laser device according to another embodiment of the present invention. Those parts of the discharge-pumped excimer laser device shown in FIG. 8 which are identical to those of the discharge-pumped excimer laser device shown in FIG. 3 are denoted by identical or corresponding reference characters, and will not be described in detail below.

While the discharge-pumped excimer laser device shown in FIG. 8 is operated to oscillate a laser beam, two flow path opening/closing units 72 connected to a laser gas supply 71 are closed and two flow path opening/closing units 73 disposed in the gas inlet pipes 21 are opened to introduce a laser gas, from which dust particles have steadily been removed, into the magnetic bearings and the motor. For replenishing the laser gas, the flow path opening/closing units 73 disposed in the gas inlet pipes 21 are closed and the flow path opening/closing units 72 are opened to supply a fresh laser gas from the laser gas supply 71, so that the fresh laser gas is supplied via the magnetic bearings and the motor into the casing 1.

For fully replacing the laser gas, all the flow path opening/closing units 72, 73 are closed, and the old laser gas is removed from the casing 1. After the old laser gas is removed from the casing 1, only the flow path opening/closing units 72 are opened to supply a fresh laser gas from the laser gas supply 71. When the fresh laser gas is thus supplied, since no laser gas flow is produced from the casing 1 to the magnetic bearings and the motor, dust particles present in the casing 1 are reliably prevented from entering the magnetic bearings and the motor.

Figure 9:
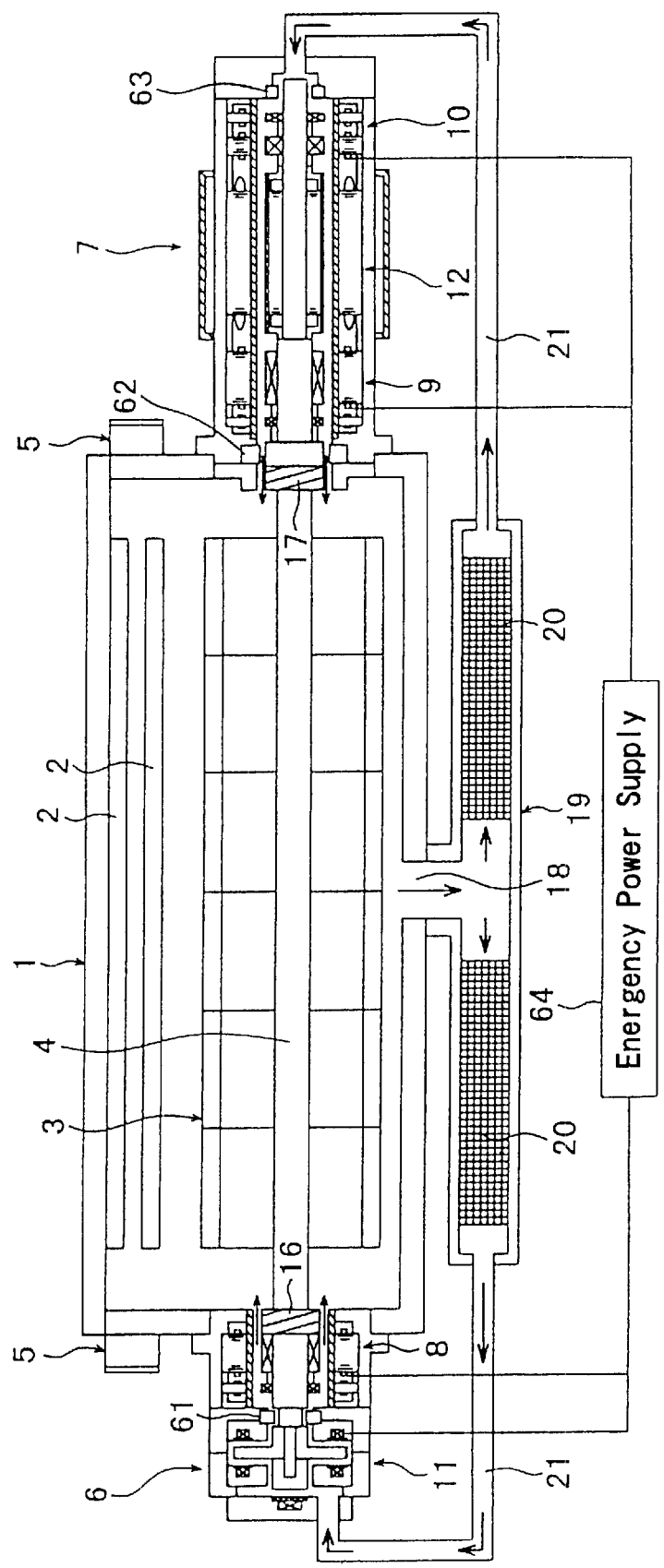
FIG. 9 is an axial cross-sectional view of a discharge-pumped excimer laser device according to still another embodiment of the present invention.

FIG. 9 shows a discharge-pumped excimer laser device according to still another embodiment of the present invention. Those parts of the discharge-pumped excimer laser device shown in FIG. 9 which are identical to those of the discharge-pumped excimer laser device shown in FIG. 3 are denoted by identical or corresponding reference characters, and will not be described in detail below. The discharge-pumped excimer laser device shown in FIG. 9 differs from the discharge-pumped excimer laser device shown in FIG. 3 with respect to protective bearings.

The discharge-pumped excimer laser device shown in FIG. 9 has protective bearings 61, 62, 63 which comprise sliding bearings for supporting the rotatable shaft 4 when the magnetic bearings are not in operation. The protective bearings 61, 62, 63 are positioned closely to the radial magnetic bearings 8, 9, 10. With the protective bearings 61, 62, 63 thus positioned, the inter-bearing span of the rotatable shaft 4 supported by the protective bearings 61, 62, 63 is substantially equal to the inter-bearing span of the rotatable shaft 4 supported by the radial magnetic bearings 8, 9, 10. Therefore, the critical speed of the rotatable shaft 4 remains substantially unchanged regardless of whether the rotatable shaft 4 is supported by the radial magnetic bearings 8, 9, 10 or by the protective bearings 61, 62, 63. Consequently, even if the rotatable shaft 4 needs to be supported by the protective bearings 61, 62, 63 due to a failure of the radial magnetic bearings 8, 9, 10, for example, the rotatable shaft 4 can be rotated stably.

The protective bearings 61, 62, 63 comprise ring members made of alumina ceramics. Therefore, the protective bearings 61, 62, 63 are of a structure having less gas traps and can be manufactured relatively inexpensively. The protective bearings 61, 62, 63 of such an arrangement are advantageous especially if the radial magnetic bearings 8, 9, 10 and the axial magnetic bearing 11 have an emergency power supply 64 and the frequency at which the rotatable shaft 4 rotates on the protective bearings 61, 62, 63 is extremely low.

The ring members of the protective bearings 61, 62, 63 may alternatively be made of alumina ceramics, zirconia ceramics ($ZrO_2$), polytetrafluoroethylene (PTFE), or a composite material of these substances.

The emergency power supply 64 may also be used in the discharge-pumped excimer laser device shown in FIG. 3 or 8. If the emergency power supply 64 is incorporated in the discharge-pumped excimer laser device shown in FIG. 3 or 8, then the period for replacing the protective bearings can be greatly extended. Furthermore, the protective bearings may be of different types such that those disposed near the radial magnetic bearings 8, 9 may comprise rolling bearings and that disposed near the radial magnetic bearing 10 may comprise a sliding bearing.

Figure 1:
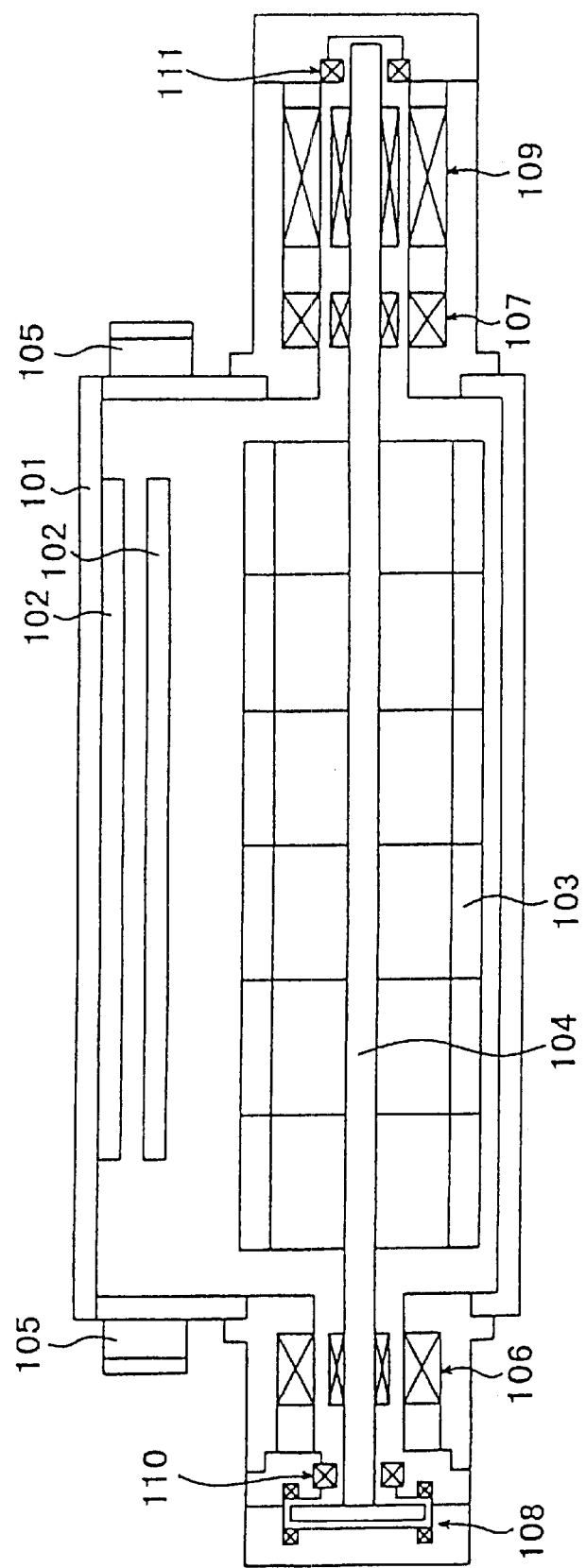
FIG. 1 is an axial cross-sectional view of a conventional discharge-pumped excimer laser device.
Figure 2:
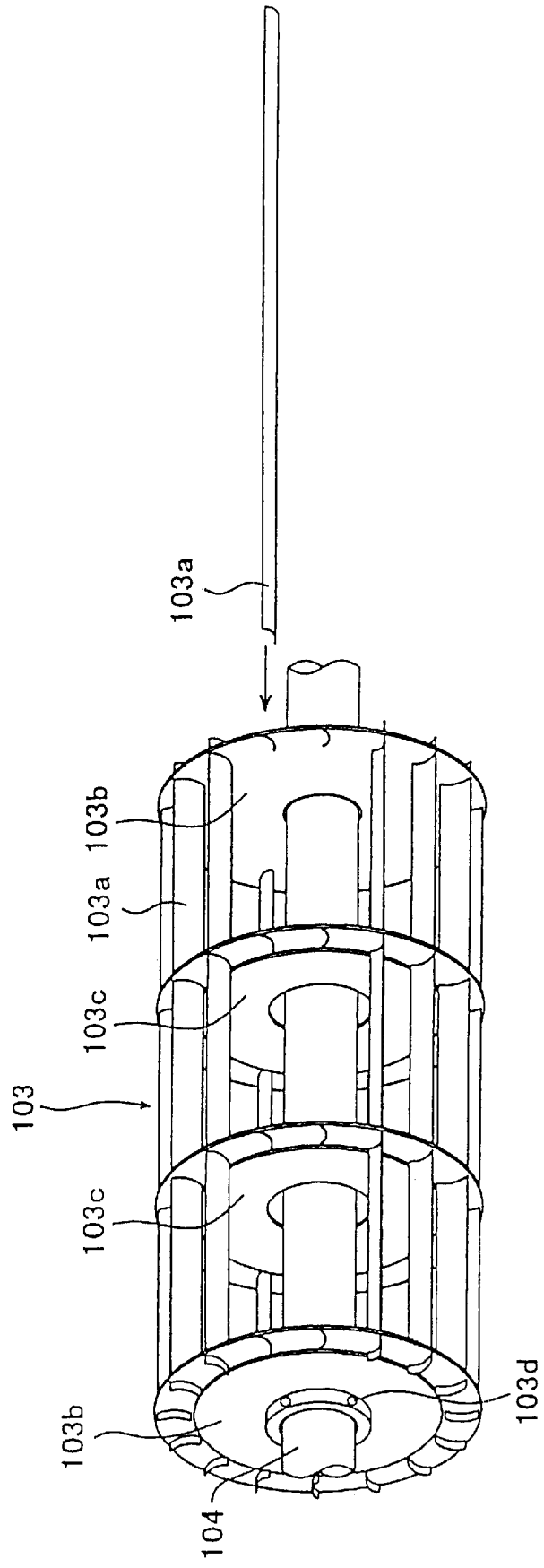
FIG. 2 is a perspective view of a cross-flow fan used in the conventional discharge-pumped excimer laser device shown in FIG. 1.

The discharge-pumped excimer laser devices shown in FIGS. 1, 6, and 7 have three radial magnetic bearings with protective bearings disposed near the respective radial magnetic bearings. However, it is not necessary to provide protective bearings near all the radial magnetic bearings, respectively, but at least two protective bearings may be provided near the respective radial magnetic bearings 8, 9 that are positioned on the opposite ends of the cross-flow fan 3.

Figure 10:
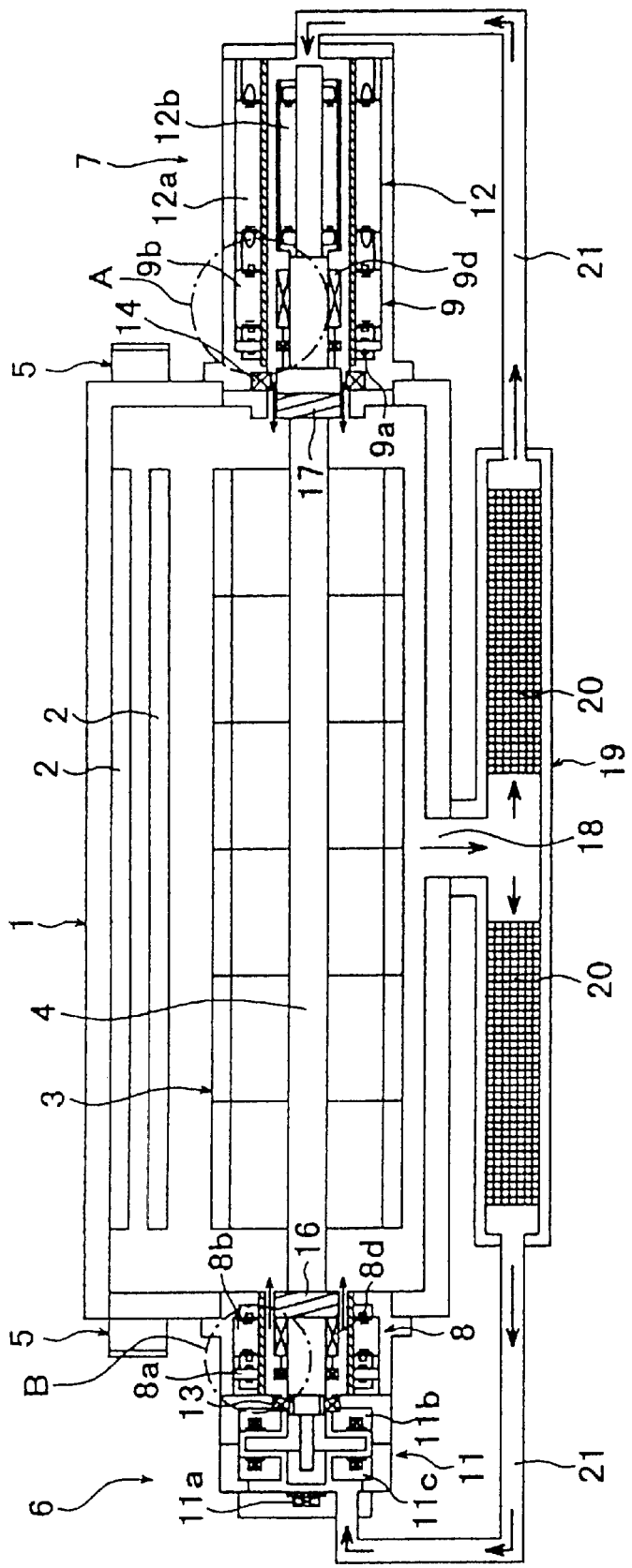
FIG. 10 is an axial cross-sectional view of a discharge-pumped excimer laser device according to yet another embodiment of the present invention.

FIG. 10 shows a discharge-pumped excimer laser device according to yet another embodiment of the present invention. Those parts of the discharge-pumped excimer laser device shown in FIG. 10 which are identical to those of the discharge-pumped excimer laser device shown in FIG. 3 are denoted by identical or corresponding reference characters, and will not be described in detail below. The discharge-pumped excimer laser device shown in FIG. 10 differs from the discharge-pumped excimer laser device shown in FIG. 3 in that it does not have the radial magnetic bearing 10 which is disposed on the shaft end of the motor 12 shown in FIG. 1. The radial magnetic bearing 10 which is disposed on the shaft end of the motor 12 shown in FIG. 1 is effective to reduce vibrations caused by the motor 12 for thereby allowing the motor 12 to rotate stably if the motor 12 is of a large size and hence produces large vibrations. Therefore, if the motor 12 is of a small size and hence produces small vibrations, then no radial magnetic bearing may be disposed on the shaft end of the motor 12, as shown in FIG. 10.

In the above discharge-pumped excimer laser device, in order to make the bearing rigidity of the radial magnetic bearing 9 positioned closely to the motor 12 greater than the bearing rigidity of the radial magnetic bearing 8 positioned remotely from the motor 12, the cross-sectional area of the core of the electromagnet of the radial magnetic bearing 9 is greater than the cross-sectional area of the core of the electromagnet of the radial magnetic bearing 8. However, other arrangements may be employed to make the bearing rigidity of the radial magnetic bearing 9 positioned closely to the motor 12 greater than the bearing rigidity of the radial magnetic bearing 8 positioned remotely from the motor 12. For example, the dimension of the gap between the electromagnet 9b and the electromagnet target 9d of the radial magnetic bearing 9 may be smaller than the dimension of the gap between the electromagnet 8b and the electromagnet target 8d of the radial magnetic bearing 8. Alternatively or additionally, the number of turns of the coil of the electromagnet 9b of the radial magnetic bearing 9 may be greater than the number of turns of the coil of the electromagnet 8b of the radial magnetic bearing 8.

Figure 11:
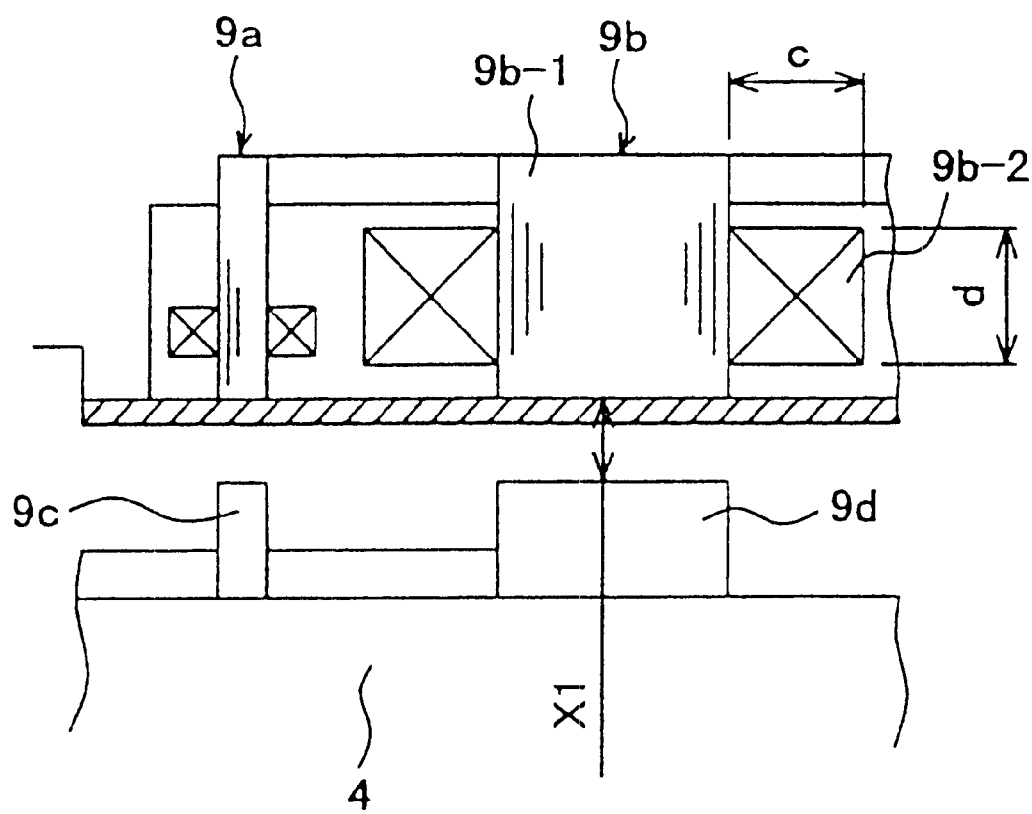
FIG. 11 is an enlarged fragmentary cross-sectional view showing an encircled portion A in the discharge-pumped excimer laser device shown in FIG. 10.
Figure 12:
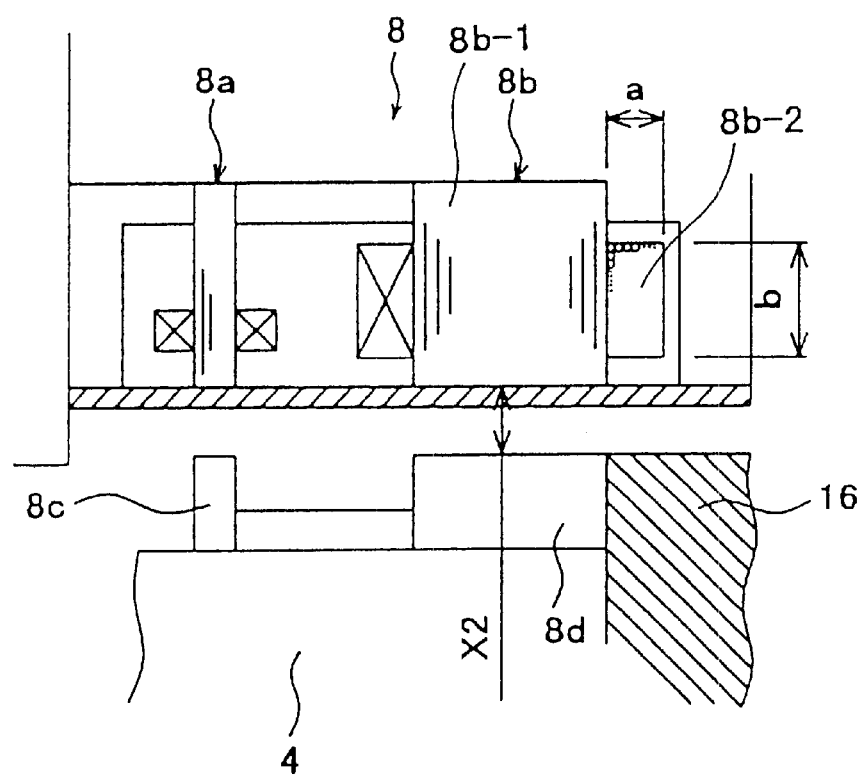
FIG. 12 is an enlarged fragmentary cross-sectional view showing an encircled portion B in the discharge-pumped excimer laser device shown in FIG. 10.

FIG. 11 is an enlarged fragmentary cross-sectional view showing an encircled portion A in the discharge-pumped excimer laser device shown in FIG. 10, and FIG. 12 is an enlarged fragmentary cross-sectional view showing an encircled portion B in the discharge-pumped excimer laser device shown in FIG. 10. The bearing rigidity of a magnetic bearing may be increased by increasing a magnetic attractive force F generated by the electromagnet of the magnetic bearing. The magnetic attractive force F is proportional to the square of the magnetic flux density B and the cross-sectional area S of the core. The magnetic flux density B is proportional to the number N of turns of the coil and the coil current i, and is inversely proportional to the dimension of the gap x. Therefore, in order to increase the magnetic attractive force F, the cross-sectional area S of the core may be increased, the number N of turns of the coil may be increased, the coil current i may be increased, or the dimension of the gap x may be reduced.

In FIGS. 11 and 12, the electromagnet 9b near the motor 12 has a coil 9b-2 comprising a copper wire wound in c layers and d columns (the number of turns: c×d) around an electromagnet core 9b-1, and the electromagnet 8b remote from the motor 12 has a coil 8b-2 comprising a copper wire wound in a layers and b columns (the number of turns: a×b) around an electromagnet core 8b-1. Therefore, in order to increase the bearing rigidity of the radial magnetic bearing 9 near the motor 12, the number of turns: c×d may be made greater than the number of turns: a×b, and the dimension X1 of the gap between the electromagnet 9b and the electromagnet target 9d of the radial magnetic bearing 9 may be made smaller than the dimension X2 of the gap between the electromagnet 8b and the electromagnet target 8d of the radial magnetic bearing 8 (X1<X2).

Figure 13:
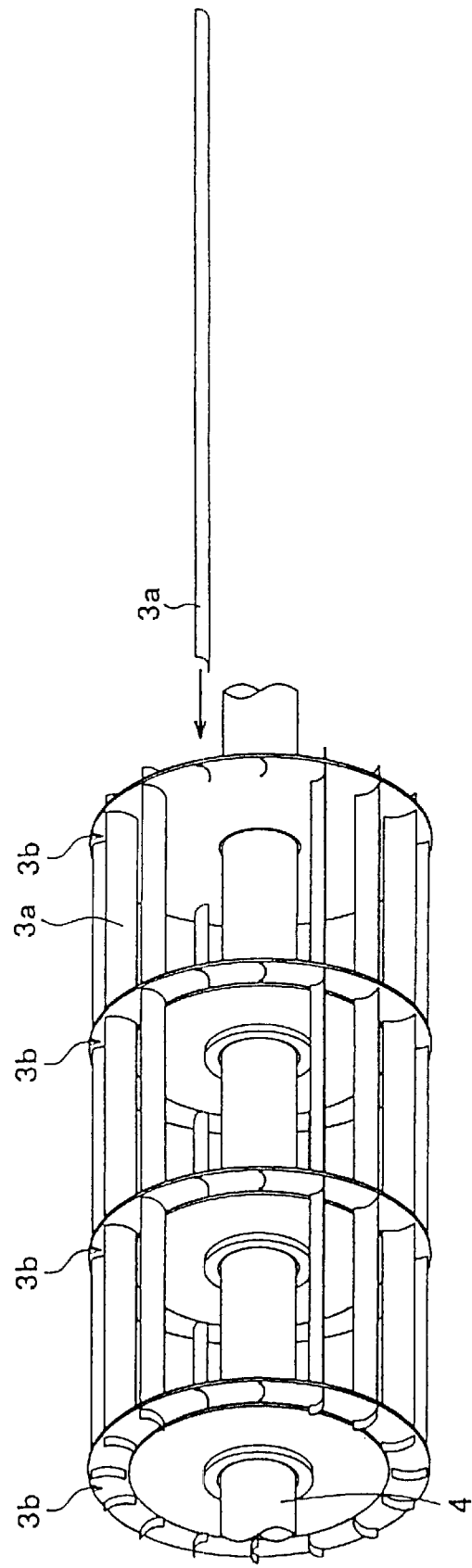
FIG. 13 is a perspective view of a cross-flow fan used in the discharge-pumped excimer laser device according to the present invention.

FIG. 13 shows the cross-flow fan 3 used in the discharge-pumped excimer laser device according to the present invention. As shown in FIG. 13, the cross-flow fan 3 comprises a plurality of parallel blades 3a and a plurality of ring plates 3b. The ring plates 3b are disposed at spaced intervals in the axial direction of the rotatable shaft 4. The ring plates 3b have attachment holes or recesses defined therein near their outer circumferential edges for attachment of the blades 3a, and attachment bosses at their inner circumferential edges for attachment of the rotatable shaft 4.

For assembling the cross-flow fan 3, one of the ring plates 3b on an end of the cross-flow fan 3 is first press-fitted over the rotatable shaft 4, and then the blades 3a are inserted through the attachment holes or recesses in the press-fitted ring plate 3b. Then, a next ring plate 3b is press-fitted over the rotatable shaft 4 while it is being guided by the blades 3a, with care taken not to twist the blades 3a. The above installing cycle is repeated until all the ring plates 3b are press-fitted over the rotatable shaft 4. Finally, the outer circumferential edges of all the ring plates 3b are crimped to fix the blades 3a and the ring plates 3b to each other.

With the cross-flow fan 3 constructed as described above, the rotatable shaft 4 and the ring plates 3b are firmly secured to each other without the danger of wobbling with respect to each other. Therefore, the cross-flow fan 3 is free of the problems referred to above with regard to the conventional cross-flow fan. If the rotatable shaft 4 and the ring plates 3b are made of the same material, e.g., austenitic stainless steel such as SUS316L or the like, the rotatable shaft 4 and the ring plates 3b remains fixed together regardless temperature cycles which the cross-flow fan 3 undergoes. Therefore, inasmuch as unbalancing forces produced on the rotatable shaft 4 upon rotation thereof when the discharge-pumped excimer laser device is in operation or shipped remain unchanged, vibrations caused during operation are not changed. By making balancing adjustments to reduce unbalancing forces on the rotatable shaft 4 when the discharge-pumped excimer laser device is manufactured, the discharge-pumped excimer laser device suffers, reduced vibrations for a long period of time.

Although certain preferred embodiments of the present invention have been shown and described in detail, it should be understood that various changes and modifications may be made therein without departing from the scope of the appended claims.

What is claimed is:

1. A discharge-pumped excimer laser device comprising:
   a casing filled with a laser gas;
   a pair of main discharge electrodes disposed in said casing for producing an electric discharge to discharge-pump the laser gas to emit a laser beam;
   a cross-flow fan for producing a high-speed laser gas flow between said main discharge electrodes, said cross-flow fan having a rotatable shaft projecting from opposite ends thereof;
   magnetic bearings, said rotatable shaft being rotatably supported in a non-contact manner by said bearings;
   protective bearings for supporting said rotatable shaft when said magnetic bearings are not in operation; and
   a motor for actuating said cross-flow fan;
   said magnetic bearings including radial magnetic bearings disposed respectively on the opposite ends of said cross-flow fan, said motor being disposed on an end of said rotatable shaft near one of said radial magnetic bearings, said one of the radial magnetic bearings having a bearing rigidity greater than the bearing rigidity of the radial magnetic bearing which is disposed remotely from said motor.

2. A discharge-pumped excimer laser device according to claim 1, wherein said radial magnetic bearings have respective electromagnets having respective cores, the core of the electromagnet of said one of the radial magnetic bearings having a cross-sectional area greater than the cross-sectional area of the core of the electromagnet of the radial magnetic bearing which is disposed remotely from said motor, whereby the bearing rigidity of said one of the radial magnetic bearings is greater than the bearing rigidity of the radial magnetic bearing which is disposed remotely from said motor.

3. A discharge-pumped excimer laser device according to claim 1, wherein said radial magnetic bearings have respective electromagnets and respective electromagnet targets, and the dimension of a gap between the electromagnet and the electromagnet target of said one of the radial magnetic bearings is smaller than the dimension of a gap between the electromagnet and the electromagnet target of the radial magnetic bearing which is disposed remotely from said motor, whereby the bearing rigidity of said one of the radial magnetic bearings is greater than the bearing rigidity of the radial magnetic bearing which is disposed remotely from said motor.

4. A discharge-pumped excimer laser device according to claim 1, wherein said radial magnetic bearings have respective electromagnets including respective coils, and the number of turns of the coil of the electromagnet of said one of the radial magnetic bearings is greater than the number of turns of the coil of the electromagnet of the radial magnetic bearing which is disposed remotely from said motor, whereby the bearing rigidity of said one of the radial magnetic bearings is greater than the bearing rigidity of the radial magnetic bearing which is disposed remotely from said motor.

5. A discharge-pumped excimer laser device according to claim 1, wherein said magnetic bearings include another radial magnetic bearing disposed on a shaft end of said motor.

6. A discharge-pumped excimer laser device according to claim 1, wherein said protective bearings comprise rolling bearings each comprising rolling members, an inner race, and an outer race, at least one of said rolling members, said inner race, and said outer race being made of alumina ceramics or zirconia ceramics.

7. A discharge-pumped excimer laser device according to claim 1, wherein said protective bearings comprise sliding bearings each made of alumina ceramics, zirconia ceramics, polytetrafluoroethylene, or a composite material thereof.

8. A discharge-pumped excimer laser device comprising:

a casing filled with a laser gas;

a pair of main discharge electrodes disposed in said casing for producing an electric discharge to discharge-pump the laser gas to emit a laser beam;

a cross-flow fan for producing a high-speed laser gas flow between said main discharge electrodes; and magnetic bearings and a motor for supporting and actuating said cross-flow fan, wherein said cross-flow fan comprises:

a rotating shaft rotatably supported in a non-contact manner by said magnetic bearings;

a plurality of ring plates having attachment holes or recesses defined therein, said ring plates being disposed at spaced intervals in an axial direction of the rotatable shaft, said ring plates being press-fitted over said rotatable shaft; and a plurality of parallel blades being inserted through attachment holes or recesses in said ring plates and crimped thereto, wherein the ring plates, the blades and the rotatable shaft are made of same material and are firmly secured to each other.

* * * * *